May 21, 1935.  F. H. OWENS  2,002,352
SOUND FILM APPARATUS
Filed March 21, 1933  4 Sheets-Sheet 1
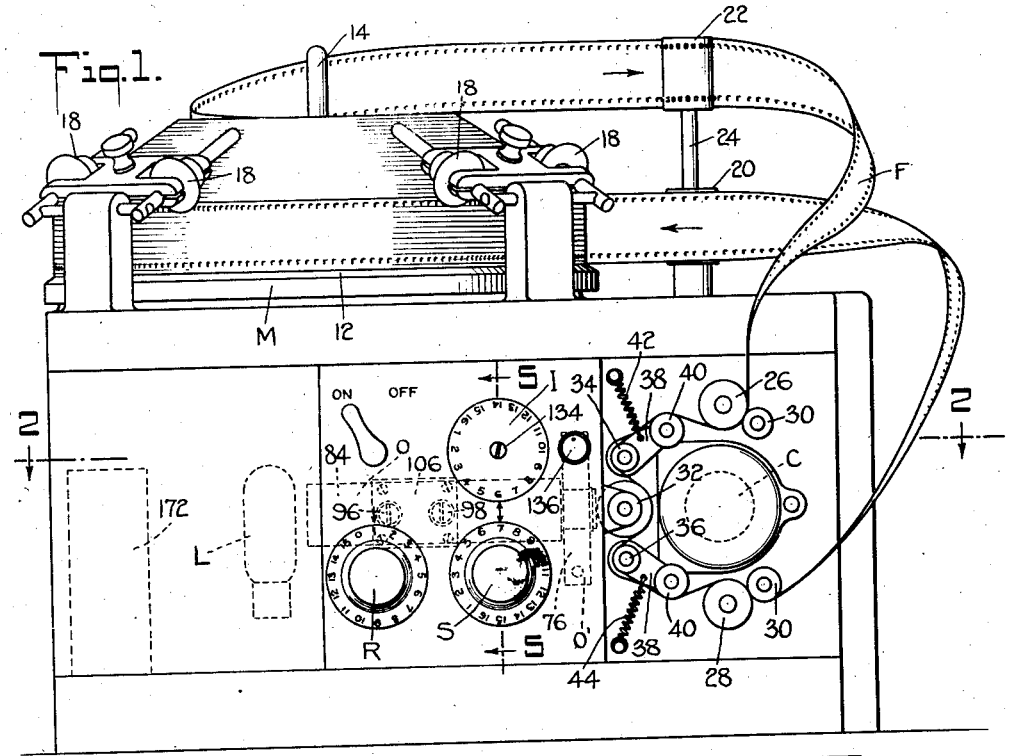
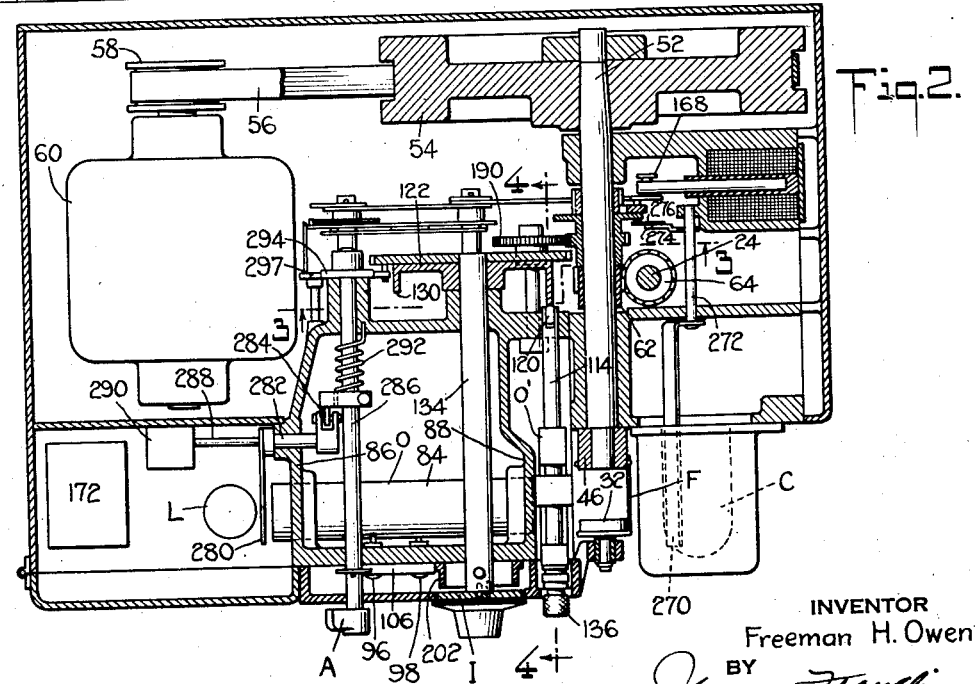
INVENTOR
Freeman H. Owens
BY
ATTORNEYS May 21, 1935.  F. H. OWENS  2,002,352

SOUND FILM APPARATUS

Filed March 21, 1933  4 Sheets-Sheet 2

INVENTOR
Freeman H. Owens
BY
ATTORNEYS

May 21, 1935.　　　F. H. OWENS　　　2,002,352
SOUND FILM APPARATUS
Filed March 21, 1933　　　4 Sheets-Sheet 3
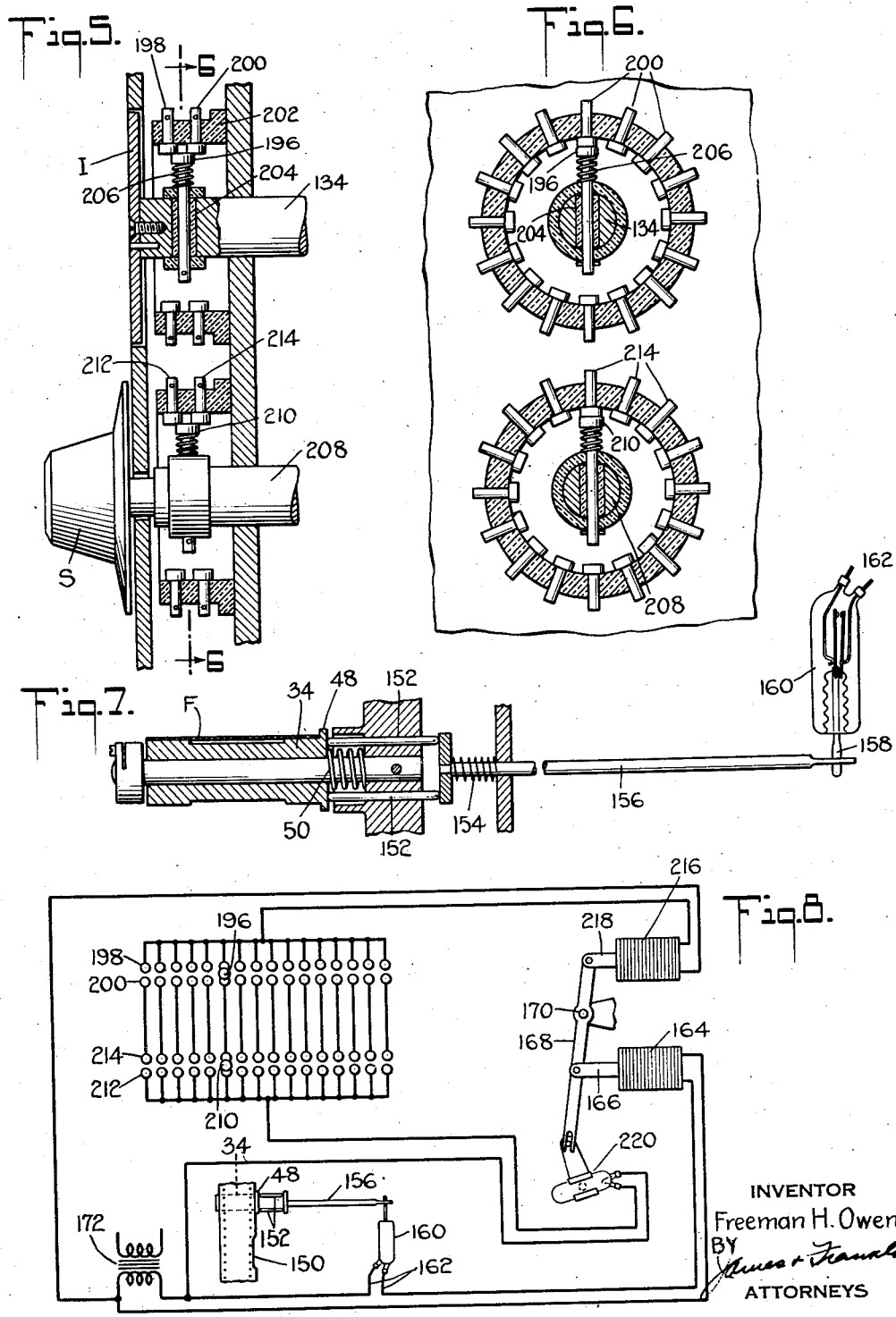

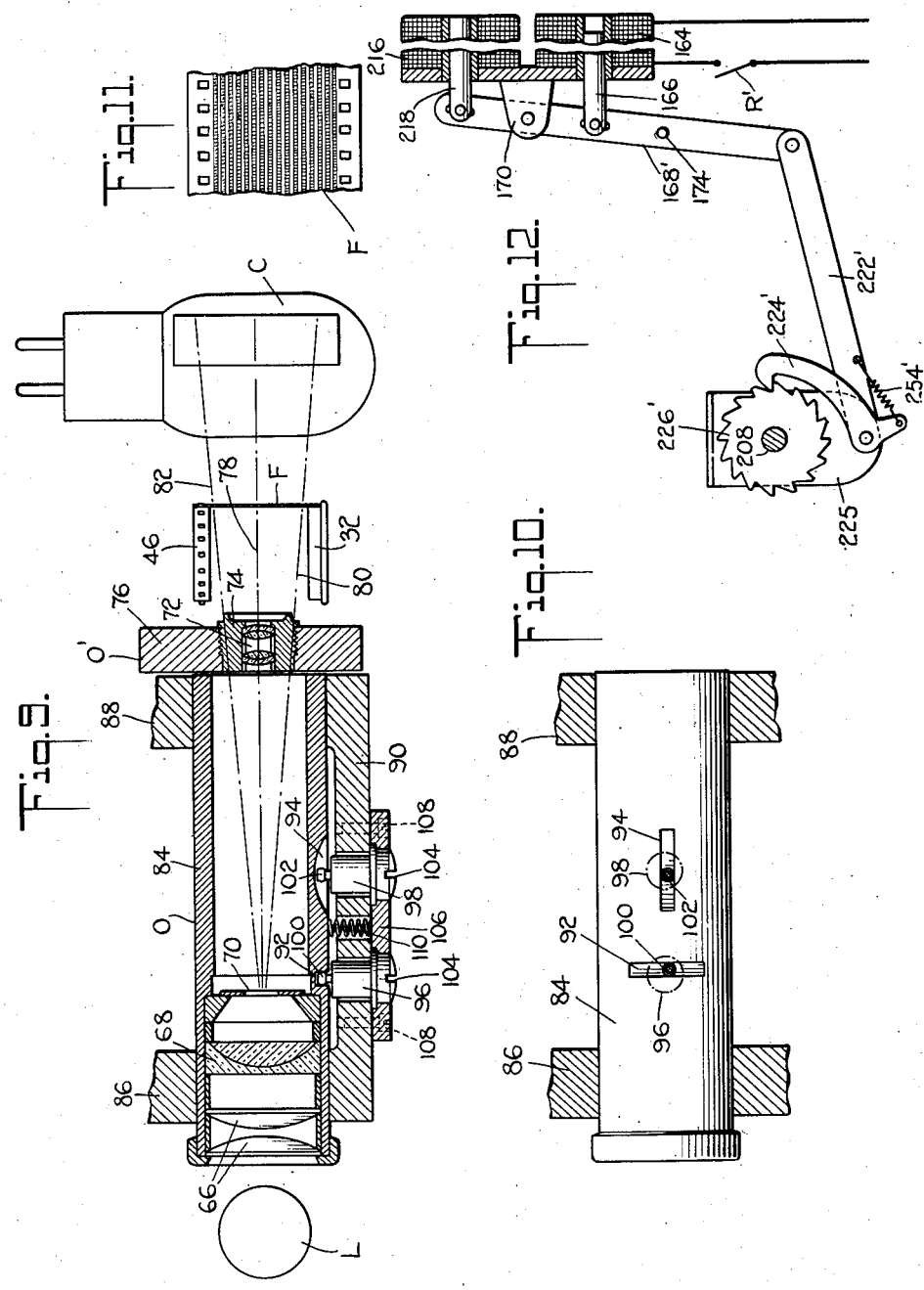

Patented May 21, 1935

2,002,352

UNITED STATES PATENT OFFICE 2,002,352

SOUND FILM APPARATUS

Freeman H. Owens, New York, N. Y.

Application March 21, 1933, Serial No. 661,901

41 Claims. (Cl. 179—100.3)

This invention relates to sound film apparatus and more particularly to such apparatus intended to reproduce sound recorded on a plurality of sound tracks disposed on a film used solely for sound reproduction.

It has been suggested to use sound recording on motion picture film solely for the reproduction of sound, thereby taking the place of an ordinary phonograph. The arrangement is, of course, far more satisfactory than an ordinary phonograph because of the extreme length of reproduction obtainable, making possible the reproduction of a complete opera or musical show in one continuous performance, or, if desired, the acting of a complete play or the reading of a complete book as an aid to the blind, for example. The object of the present invention is to generally improve sound film apparatus, particularly apparatus of the type above outlined.

When motion picture film is used solely for sound reproduction, it is, of course, provided with a plurality of collaterally disposed sound tracks instead of merely a single marginal sound track as is the case when most of the film is used for picture projection. It then becomes necessary to confine the sound translation to a single sound track and yet to permit of movement transversely of the film in order to accommodate a change from one sound track to another. This movement is preferably accomplished by shifting the beam of illumination striking the film, the light-sensitive cell on the opposite side of the film being made extensive in area so as to cover the entire width of the film. Even this arrangement, however, is complex rather than simple because of the fact that the optical system of the apparatus necessitates other adjustments, such as a focusing adjustment for the slit which defines the light beam, and a rotational adjustment for leveling the slit with respect to the direction of the sound track, and so on. A more particular object of my invention is to simplify the mechanism for obtaining the various desirable adjustments of the optical or illumination system, which I accomplish, broadly, by separating the optical system into two parts and confining certain of the adjustments to one of the thus separated parts while obtaining the desired shifting of the light beam by transverse movement solely of the other of the thus separated parts. Still another object of my invention resides in the provision of appropriate mechanical means for providing the necessary adjusting movements for the said parts of the optical system.

It will be evident that the apparatus may be used for the reproduction of a sound record of moderate length, for example, that corresponding to a single sound track on the film or, if preferred may be used for the reproduction of all of the sound tracks in continuous sequence, as when reproducing a complete opera, and that in the latter case it is important that the light beam be automatically shifted to so follow the sound tracks on the film as to provide continuous sound translation. Accordingly, another object of my invention resides in the provision of appropriate mechanism for thus keeping the shifting of the light beam synchronized with the film movement for progressive sound translation. In the particular case where the sound tracks run parallel to the edges of the film the resulting movement is a step by step movement initiated, for example, by an appropriate indicator on the film itself.

Of course, when the sound tracks correspond to individual and independent selections, it becomes desirable to permit selection of any desired sound track, in contrast with sequential reproduction. It is further desirable to permit the next desired selection to be predetermined and indicated in advance as, for example, during the playing of a preceding selection, and to arrange the mechanism to cause automatic movement of the light beam from the sound track last played to that next desired. Further objects of my invention are to fulfill the foregoing desiderata and to provide selector mechanism which is usable at the option of the listener and which permits the listener to establish at any time the sound track next to be played.

Still further objects of my invention are to provide appropriate means making possible, first, the automatic repetition of any selection which is especially favored; and second, the optional establishement of any desired number of times that the favored selection is to be repeated before the mechanism for shifting the light beam is again made effective to transfer the sound reproduction to the next desired sound track. Still another object of my invention resides in the provision of relatively simplified mechanism so interrelated as to make possible all of the foregoing features including, for example, an indication at any time of the sound track then played, an indication at any time of the sound track next to be played, a selection in advance of any desired sound track next to be played, a repetition of a sound track then being played for any desired number of times, and, in the absence of special indication, a normal progressive reproduction of the sound tracks in sequential order.

Still another object of my invention resides in the provision of appropriate shutter mechanism or other means for making the illumination system inoperative during the shifting of the light beam heretofore referred to, thereby completely and cleanly interrupting the sound translation for a short interval of time, rather than producing distortion and conflicting sounds during the transition period. Still another object of my invention is to provide automatic stop mechanism for interrupting and shutting down the apparatus when the end of the last sound track is reached, thus making it readily possible for the operator to change the film reel being used. Still another object of my invention resides in the provision of appropriate shutter or other means for making the illumination system ineffective whenever the apparatus is stopped, thereby cleanly and abruptly terminating the sound reproduction and preventing the distortion and change of pitch caused by slowing of the driving motor speed when the motor is deenergized.

To the accomplishment of the foregoing and such other objects as will hereinafter appear, my invention consists in the sound film apparatus and the elements thereof and their relation one to the other, as hereinafter are more particularly described in the specification and sought to be defined in the claims. The specification is accompanied by drawings in which:

Fig. 1 is a front elevation of sound film apparatus embodying my invention;

Fig. 2 is a horizontal section taken in the plane of the line 2—2 in Fig. 1;

Fig. 5 is an enlarged section taken in the plane of the line 5—5 in Fig. 1;

Fig. 6 is a section taken in the plane of the line 6—6 in Fig. 5;

Fig. 7 is a detail of the trip mechanism;

Fig. 8 is a schematic showing explanatory of the control mechanism of the apparatus;

Fig. 9 is a horizontal section taken through the optical system of the apparatus;

Fig. 10 is a front elevation of a portion thereof;

Fig. 11 is a fragment of film showing the multiple sound tracks; and

Fig. 12 is a schematic showing similar to Fig. 3 but of a simplified modification of the invention.

Figure 3:
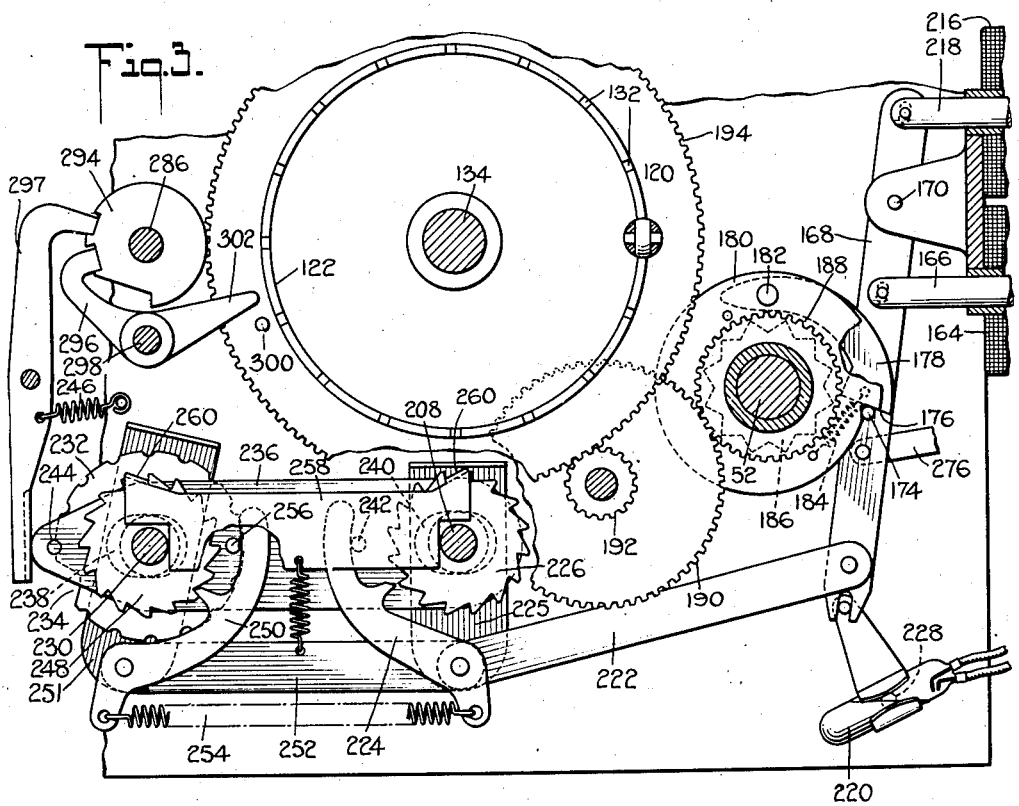
Fig. 3 is a vertical section taken in the plane of the line 3—3 in Fig. 2.

Referring to the drawings and particularly to Fig. 1 thereof, the sound reproducing apparatus comprises a lamp L the illumination from which is appropriately concentrated and controlled by an optical system O, O' and then passed through a film F on the opposite side of which there is located a photo-electric or other light-sensitive cell C. The film F is preferably in the form of an endless band a reel of which is carried by an appropriate magazine M. The film F is provided with a considerable number of collaterally disposed sound tracks, say, sixteen, and an appropriate indicator I may be used to at all times indicate which of the sound tracks is then being reproduced. A selector dial S is optionally usable by the operator to predetermine which sound track is next to be played. A repeat dial R is also optionally usable to cause repeated reproduction of any desired selection or sound track, and further permits the operator to predetermine the number of times the said desired sound track will be repeated. The entire apparatus may be energized or deenergized by means of an appropriate control arm A, and, if desired, appropriate mechanism may be provided to automatically move the control arm A to the "off" position when the last sound track on the film has been played. The foregoing parts and the manner in which their desired functions are obtained, I shall now describe in greater detail.

*Film feed mechanism*

The film F is preferably an endless band of film carried by magazine M. This magazine is not claimed herein and need not be described in detail, it being fully described in my copending application Ser. No. 636,276 filed October 5, 1932 and entitled "Endless film magazine". As is there explained, the magazine comprises an upwardly dished support plate 12 rotatably mounted on a vertical shaft 14. The film reel rests on the upwardly dished or conical portion of plate 12, the reel being supported at its periphery by guide rollers 18. The film is fed into the magazine at the outer periphery of the reel and is withdrawn from the magazine at the center thereof, as is indicated by the arrows. Sprockets 20 and 22, mounted on vertical shaft 24, provide positive feed for the entrant and exit strands of film, these being engaged on opposite sides of the sprockets by appropriate pad rollers, not shown. The support disc 12 is preferably rotated under light frictional drive, as by a belt, not shown, extending between vertical shaft 24 and the dished plate 12.

The loop of film between sprockets 20 and 22 is guided through the illumination system of the apparatus by an appropriate system of rollers including a feed roller 26 and a take-up roller 28, these being sprockets provided with pad rollers 30. The loop of film thus produced at the sound translation point between the feed and take-up rollers 26 and 28 is supported at the sound translation point by a roller film guide 32 immediately preceded and succeeded by lateral guide rollers 34 and 36. At the lateral guide rollers there are pivoted tensioning arms 38, carrying idlers 40, which tension the film under the influence of springs 42 and 44. The roller film guide 32 is shown in greater detail in Figs. 2 and 9, in which it will be evident that the guide is sprocketed on only one side, 45, the opposite side 32 being flanged and determining the lateral location of the film. The film is, of course, held against the flanged portion 32 of the roller film guide by the two lateral guide rollers 34 and 36 which are flanged on only one side, specifically the side opposite flange 32, and which are resiliently urged toward flange 32. One of these lateral guide rollers, as modified to include trip mechanism later described, is shown in Fig. 7, in which the roller 34, flanged at only one end, 48, is resiliently urged axially toward the opposite end by a compression spring 50.

Referring to Fig. 2, the sprocketed portion 46 of roller film guide 32 is mounted on a horizontal shaft 52 which carries a driven pulley 54 belted at 56 to the driving pulley 58 of an appropriate driving motor 60. Shaft 52 acts as the main drive shaft of the apparatus and is geared, preferably in 1:1 ratio by helical gearing 62 and 64 to the vertical shaft 24 heretofore referred to. This vertical shaft carries feed sprockets 20 and 22 for the film magazine and is also belted to the frustro-conical disc of said magazine. Furthermore, appropriate helical gearing, exactly like the gearing 62, 64, is located on vertical shaft 24 above and below gearing 64 to drive the horizontal shafts of the feed and take-up sprockets 26 and 28 at the sound translation point. This gearing has been omitted in order not to unduly complicate the drawings. Its use, however, is important because then the feed and take-up sprockets 26 and 28 may be used for propelling the film, the roller film guide acting solely as a guide and not primarily to drive the film. At this point it may be observed that the film tension below the roller film is preferably made greater than the film tension above the roller film, that is, the spring 44 is preferably tensioned more than the spring 42, thereby keeping the film sprocket holes running against one side of the sprocket teeth, the roller film guide then acting as a hold-back means rather than as a film propulsion means. Main drive shaft 52 also carries clutch mechanism, described later, for driving the shifting means for the light beam.

*The optical system*

The illumination system is shown in greatest detail in Fig. 9 of the drawings, which is a horizontal section therethrough. Light is obtained from an appropriate lamp L and is passed through an optical system divided into two main portions, O and O', after which it is passed through film F and impressed upon a light-sensitive cell C. The optical system O, O' includes a condenser lens system 66, a cylindrical lens 68 arranged with its axis horizontal, a mechanical slit 70, and a camera lens system 72. With this arrangement an intense concentrated beam of light, which is rectangular in section like the slit, is directed upon the film, its vertical dimension being minimized, and its horizontal dimension being made somewhat less than the width of a sound track on the film.

For best results a number of adjustments are necessary. The lens systems should be relatively movable axially in order to provide for proper focusing of the light beam. The cylindrical lens and slit should be rotatable about the axis of the optical system in order to provide for proper leveling or horizontality of the beam of light. These adjustments are greatly complicated when it is sought to provide a transverse relative movement of the film F and the light beam to reproduce one or another of the sound tracks on the film. In accordance with the present invention, the optical system is divided into the two parts O and O', and the desired transverse shifting of the light beam is obtained by sidewardly moving only one of these parts, the part O' carrying the camera lens system 72. I have found that the image of the slit reproduced by the camera lens system 72 and directed upon the film is accurately reproduced by the camera lens system despite movement of the same sidewardly. Specifically, the camera lens system 72 is mounted in an appropriate holder 74 which is threaded into a slidable plate 76, and by appropriate transverse movement of the plate 76 the desired light beam may be shifted across the film. This may be represented in a schematic way by the broken line 78 showing the transmission of the light beam through the center of the film, in contrast with the broken lines 80 and 82 showing the shifting of the light beam to one side or the other of the film. It will be appreciated that the photo-electric cell C is made sufficiently large in area to respond to light transmitted through any point along the width of the film. It will further be noticed that the amount of necessary movement of the slide 76 is reduced relative to the actual width of the film by the optical leverage obtained as a result of the intermediate location of the slide O'.

Inasmuch as the first portion O of the optical system need not be moved transversely, the provision of desired adjustments is a relatively simple matter. The condenser lens system 66, the cylindrical lens 68, and the mechanical slit 70 are all carried in an appropriate tube 84 which is accurately received in bored support walls 86 and 88, forming an integral part of the apparatus frame. The frame further includes a front wall 90 extending between walls 86 and 88. One side of tube 84 is provided with a vertical slot 92 and a horizontal slot 94, as is most clearly shown in Fig. 10. The wall 90 is provided with adjusting buttons 96 and 98 carrying at their inner ends slightly eccentrically mounted pins 100 and 102 received in the slots 92 and 94. It will be evident that upon rotation of the button 96, the pin 100 causes a slight axial movement of tube 84 relative to the camera lens system 74 and the film F, and thereby permits focusing of the light beam. Rotation of button 98 causes a slight rotation of tube 84 and thus permits alignment of the slit. The desired rotation of buttons 96 and 98 is facilitated by the provision of slots 104, and the established adjustment is fixed by means of a lock plate 106 which may be tightened against the flanged heads of buttons 96 and 98 by means of a group of lock screws 108. A compression spring 110 may be located between lock plate 106 and tube 84 in order to increase the friction of the tube mounting.

Figure 4:
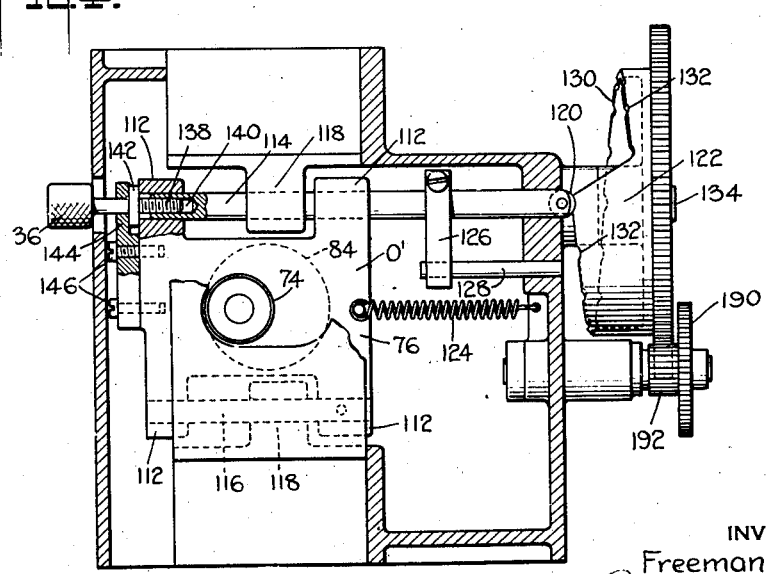
Fig. 4 is a section taken in elevation in the plane of the line 4—4 in Fig. 2.

It will also be understood that inasmuch as the slidable plate O' need not be moved axially but need only be moved transversely of the optical system, its mounting is likewise facilitated and simplified. Thus, referring to Fig. 4, the plate 76, bearing the lens holder 74, is provided with ears 112 through which there are passed upper and lower rods 114 and 116, these in turn being slidable through top and bottom lugs 118 formed integrally with the apparatus frame. The top rod 114 is extended and carries at its inner end a cam follower wheel 120 which bears against the operating surface of a cylindrical cam 122. Resilient means, here exemplified by spring 124, normally urges the slide toward cam 122, thus keeping the cam follower and cam in engagement. If rod 114 is round, as is preferably the case for simplicity, it may be supplemented by arm 126 and auxiliary rod 128, preventing the rod 114 from turning and holding the cam follower wheel 120 in desired relation to cam 122.

Cam 122 is provided with an essentially helical operating face 130, thereby permitting continuous rotation of the cam. The operating surface is preferably notched, as is indicated at 132 (Figs. 3 and 4), in order to define the division of movement of slide 76 in proper relation to the sound tracks on the film. The cam is mounted on a cam shaft 134 which extends to the front wall of the apparatus where it is provided with the indicator dial I heretofore referred to, this being best shown in Figs. 1 and 2. It will be evident that if simple manual selection of the sound track is alone sought, it is merely necessary to rotate the indicator dial I or any more conveniently shaped knob mounted on cam shaft 134. The resulting rotation of the cam shaft and cam will obviously shift the lens plate 76 from one side to the other and correspondingly shift the light beam to the desired sound track.

The location of lens slide 76 relative to the operating cam may be accurately adjusted by means of a knurled handle 136 the threaded end 138 of which is screwed into a matingly threaded hole 140 at the forward end of slide rod 114. The adjusting screw 136 is provided with a locating flange 142 held in a slot on plate 76 so that rotation of the adjusting screw shifts the position of the plate on the reciprocable rod 114. The slot in which flange 142 is held is preferably formed by the front edge of plate 76 and an additional lock plate 144 screwed to the front edge of plate 76 by screws 146. The parts are so dimensioned that when screws 146 are tightened the flange 142 is locked, thereby fixing the adjustment.

This adjustment is important for establishing the initial relation of the lens plate and cam, and is also important to take care of film shrinkage. In the event of film shrinkage the difference in dimension is taken up entirely at one side because of the nature of the roller film guide 32, as has already been explained. Each sound track is, however, slightly wider than the light beam applied thereto, thus giving some latitude for adjustment, and, by using the adjusting screw 136 to average out any change in film dimension, the shrinkage may be taken care of.

A section of film, with the surface thereof divided into sixteen sound tracks, is shown in Fig. 11, each of the tracks being, say, sixteen thousandths of an inch in width. In one particular arrangement the lens system, as shown in Fig. 9, was so adjusted that the image of the illuminated slit 70 was reduced in dimension in 2:1 ratio when projected upon the film. In other words, with a sound track sixty thousandths of an inch in width, the slit 70 may be one hundred and twenty thousandths of an inch in length or, preferably slightly less. It may be pointed out that the function of the lamp L and the first lens system, including the condenser lenses 66 and the cylindrical lens 68, is merely to produce a brightly illuminated slit, and that the lenses may therefore be eliminated, if desired, in which case the slit will be illuminated directly by the lamp without the increased intensification caused by the first lens system.

The trip mechanism

In the present apparatus the shift of the light beam from one sound track to another is arranged to take place automatically. In the case of a spiral sound track on an endless film the light beam may be moved continuously and in synchronism with the film feed mechanism. The present apparatus, however, is designed for film which is more simply provided with collaterally disposed sound tracks which are arranged parallel to the edge of the film, and the light beam is shifted to a new sound track after the old sound track has been completed. To permit the use of film reels of any desired length the shifting of the light beam is preferably initiated by trip mechanism responsive to some indicator on the film itself. In the present case the film is notched at the end thereof, an appropriate notch 150 at the edge of the film being indicated in the schematic showing of Fig. 8. Any desired brush or wiper may be used to respond to the film notch, and in the present case the lateral guide roller 34 is employed for this purpose. Referring to Fig. 7, when lateral guide roller 34, under the influence of spring 50, moves sidewardly into a notch such as the notch 150, the resulting movement is sensitively followed by pins 152 themselves lightly urged against the end of roller 134 by a spring 154 bearing against the flanged end of a rod 156 the opposite end of which engages the button 158 of a vacuum contact switch 160, thus closing the circuit between the conductors 162 leading into the switch. Obviously, any desired form of switch mechanism may be employed, but that here shown is excellent because of its sensitivity.

Referring now to Fig. 8, closing of the circuit between conductors 162 energizes a trip solenoid 164 which pulls armature 166 inwardly and thus oscillates a clutch control arm 168 in a counterclockwise direction about pivot 170. The trip solenoid 164 is energized from any appropriate source of current, here exemplified by a transformer 172 the primary of which is connected to an ordinary power supply line. Referring now to Fig. 3, the solenoid 164, the armature 166, and the clutch control arm 168, oscillating on pivot 170, all correspond to the similarly numbered parts referred to in connection with Fig. 8. Clutch control arm 168 carries a stop pin 174 which bears against the biased end 176 of a driving dog 178 carried on driven disc 180 by a pin 182. The pawl is normally urged inwardly by a spring 184, but, with the clutch arm 168 in the normal position shown in Fig. 3, the dog 178 is forced outwardly despite the spring by the engagement between pin 174 and the biased end 176 of the dog. When clutch control arm 168 is oscillated in a counter-clockwise direction, pin 174 is moved away from dog 178, thus permitting the dog to swing inwardly, and bringing it into working engagement with the driving portion 186 of the clutch, this in turn being mounted on the main drive shaft 52 of the machine, previously described. The resulting rotation of the clutch rotates gear 188 meshing with an idler 190 itself fixed to a pinion 192 meshing with a large gear 194 formed integrally with or secured to the cam 122. The gear reduction may, if desired, be made 16:1, so that one complete revolution of the clutch will shift the light beam from one to the next adjacent track, assuming, as is here the case, that the film is provided with sixteen sound tracks. Of course, if the clutch engagement is not interrupted, the drive continues and the light beam is shifted further than a single track.

The selector mechanism

It has already been mentioned in connection with Fig. 1 that the dial S is a selector dial which may be set by the operator to indicate the next sound track to be played. Referring to Figs. 5 and 6, the cam shaft is indicated at 134 and is provided near its forward end with switch mechanism including a rotatable brush or wiper 196 contacting with pairs of contacts 198 and 200. The contacts are embedded in an insulation ring or drum 202, while the wiper 196 is insulated from shaft 134 by appropriate insulation 204. A spring 206 keeps the wiper 196 in engagement with the contacts 198 and 200.

The selector dial S is mounted upon a selector shaft 208 which is similarly provided with a rotary contact switch, the shaft insulatedly carrying a wiper 210 bearing against rings 212 and 214 of paired contacts.

Reverting now to Fig. 8, the contacts 198 are all connected together; the contacts 200 are each individually connected to a corresponding contact 214; while the contacts 212 are all connected together. The wipers 196 and 210 ride along the contacts, and only when both are aligned on corresponding contacts is a circuit completed through the two switch drums, these being connected in series, as is obvious from the drawings. The compound switch mechanism is itself connected in a circuit leading to a restoring solenoid 216 which is also energized from the transformer 172.

As thus far described, it will be evident that during the playing of any sound track the next sound track to be played may be indicated by the selector dial S, this serving to move the wiper 210 to a contact corresponding to the desired sound track. At the end of the sound track being played, the trip mechanism heretofore described causes the clutch control arm to permit clutch engagement, thereby driving the cam 122 and cam shaft 134. This incidentally causes movement of the wiper 196 along the contacts of the upper switch drum, and when the contacts reach alignment the restoring solenoid 216 is energized, thereby drawing the armature 218 inwardly and oscillating the clutch control arm 168 in a clockwise direction and again disengaging the clutch.

In order to make certain additional mechanism, particularly the repeat mechanism, more conveniently applicable, the relatively simple arrangement above described is modified slightly by the inclusion in the circuit of restoring solenoid 216, of a switch 220 operated by the clutch control arm 168, and the numbers indicated on the selector dial S are displaced by one from the position of the wiper 210, instead of corresponding properly thereto. These differences will be explained in greater detail later. However, a simplified modification of the invention is schematically illustrated in Fig. 12, and in this form the numbers indicated on the selector dial S correspond properly with the position of the switch wiper 210, and the additional mercury switch 220 is omitted, so that the operation of the simplified modification of Fig. 12 is exactly in accordance with the foregoing description.

*The progressive feed mechanism*

Under normal conditions, when the operation of the instrument is not interfered with by manipulation of the selector dial or the repeat dial, the sound tracks are played progressively in sequential order. In the present apparatus this result is obtained by automatically advancing the selector dial step by step as necessary so as to next obtain the following sound track. Referring to Fig. 3 of the drawings, the clutch control arm 168 is provided with a connecting link 222 which connects the clutch control arm to a selector pawl 224 which normally engages a ratchet 226 mounted on the selector shaft 208. It will thus be evident that upon operation of the trip mechanism the clutch control arm 168 not only engages the clutch but also advances ratchet wheel 226 one notch corresponding to a movement of the selector dial by one step. The wipers 196 and 210 of the drum switches are normally in alignment, but the circuit of the restoring solenoid 216 is normally opened by reason of mercury switch 220 pivoted at 228 and connected in series with the solenoid circuit. When the clutch control arm 168 is tripped by the trip solenoid, it advances the selector dial and moves the wiper 210 to the next contact, thereby further opening the restoring solenoid circuit before switch 220 is closed. During the shifting operation, switch 220 is closed, and when wiper 196 advances another step into alignment with wiper 210, the restoring solenoid 216 is energized and moves the parts to normal position. It will be understood, of course, that the trip solenoid 164 is only temporarily energized, its circuit being opened as soon as the notch in the film is passed, but the notch is, of course, appropriately dimensioned to insure completion of the oscillation of clutch control arm 168. The operation of the progressive feed mechanism will be evident from a consideration of Figs. 3 and 8, for at the end of a sound track the trip mechanism energizes solenoid 164 and swings the clutch control arm 168 in a counter-clockwise direction. During the first part of its movement the wiper or switch contact 210 of the selector switch drum is advanced, thereby opening the circuit of restoring solenoid 216, this action taking place before switch 220 is closed, the closing of switch 220 taking place during the latter part of the movement of the clutch control arm. At the beginning of the movement of the clutch control arm, the clutch dog 178 is freed, thereby causing clutch engagement, whereupon the cam 122 begins to move and the light beam is shifted toward the next sound track. When the light beam reaches the next sound track the accompanying rotation of the cam shaft causes the wiper 196 of the upper switch drum to come into registry with the selector switch, thus completing the restoring solenoid circuit. The clutch control arm is thereby swung back into initial position, whereupon it arrests dog 178 and disengages the feed clutch. The restoring solenoid is arranged to complete the restoring movement of the clutch control arm even though energized for only the first portion of its movement, but, if it is preferred not to rely upon the electrical inertia of the inductance, a toggle spring may be added to the clutch control arm, causing it to complete its stroke to either one side or the other of the dead-center position.

The progressive feed mechanism of the modification of the invention shown in Fig. 12 differs from that already described primarily in that the selector pawl 224' and ratchet 226' are so disposed as to advance the selector shaft during the restoring rather than the tripping movement of the clutch control arm 168'. It will be recollected that in this form of the invention the selector dial registers with the selector switch, so that the selector switch is normally one step in advance of the cam switch during the playing of a sound track. At the end of the sound track the tripping mechanism oscillates the clutch control arm 168' counter-clockwise and engages the cam feed clutch, just as has already been described. The selector pawl 224' merely idles upwardly on ratchet 226'. As the light beam is shifted the cam switch is moved until the wipers 196 and 210 come into registry, whereupon the restoring solenoid 216 is energized, causing the clutch control arm 168' to be swung in a clockwise direction to its normal position. During this movement the selector pawl 224' oscillates the ratchet 226' and thus advances the selector shaft and selector switch another step ahead. The numbering of the selector dial and the wiring between the two switches are, of course, in each case properly related to the ratchet feed, although the pawl arrangement can, of course, be varied to permit similar numbering and wiring for either modification of the invention.

The operation of the progressive feed system shown in Fig. 12 will be evident from the foregoing description. It will also be evident that for optional selection of any desired sound track it is simply necessary to manually move the selector dial ahead of its normal indication to the desired sound track. When the tripping mechanism then sets the cam in motion, the light beam is shifted until the cam shaft rotates a sufficient amount to bring the cam and selector switches into registry, whereupon the restoring solenoid is energized and the clutch is disengaged.

The repeat mechanism

It has already been mentioned that repeat dial R is optionally usable to provide for repetition of a selection then being played, and further to provide for any desired number of repetitions of the said selection. The manner in which this result is obtained is best explained by reference to Fig. 3, in which shaft 230 is a repeat shaft to which the repeat dial R is fixed. Shaft 230 carries a cam 232 a portion of the periphery of which is cut away at 234. Extending between the selector shaft 208 and repeat shaft 230 is a pawl control bar 236 which is slotted at 238 and 240 to permit horizontal reciprocation. The pawl control bar is provided with a stop pin 242 for controlling selector pawl 224, and is further provided with a cam follower pin 244 cooperating with cam 232. The pawl control bar 236 is normally held to the right or in engagement with the cam 232 by a spring 246. When the repeat dial is in zero position, indicating that the selection is not to be repeated, the cut-away portion 234 is located opposite the follower pin 244 and accordingly permits the pawl control bar 236 to move to the right or to its normal position. This frees selector pawl 224 for normal operation, as has already been described. When, however, the repeat dial R is moved counter-clockwise to the numeral 1, the pawl control bar 236 is moved to the left in the position shown in Fig. 3, and in this position the pin 242 moves selector pawl 224 out of engagement with ratchet 226, thereby making the same ineffective. Under these conditions, when trip solenoid 164 is energized, it causes engagement of the clutch at the beginning of the movement of the clutch control arm 168 and thereby initiates movement of the cam shaft 134. This in turn moves the wiper 196 of the cam shaft switch drum, thereby opening the restoring solenoid circuit, this action taking place while the trip solenoid 164 is still energized. The cam shaft is set into rotation and its movement is uninterrupted until it has completed one full revolution, thus bringing the cam shaft switch back into registry with the selector switch, the latter having meanwhile not been displaced from its original position. When these switches are brought into registry, the restoring solenoid 216 is energized, thus oscillating the clutch control arm 168 to its normal position and disengaging the clutch.

To prevent continued repetition of the selection, the repeat dial is automatically moved back to its zero or normal position. For this purpose the repeat shaft 230 is provided with a ratchet 248 cooperating with a repeat pawl 250 mounted on pawl arm 251 itself operated by connecting link 222 through the medium of a pawl tie link 252 extending between the pawl arms 225 and 251 and therefore effectively between the pawls 224 and 250. Pawls 224 and 250 are normally urged into engagement with their respective ratchets by a spring 254 tensioned between the lower ends of the pawls. Repeat pawl 250 is controlled by the pawl control bar 236 through the agency of a pin 256. It will be evident from inspection that only one of the pawls is operative at any time. Normally the selector pawl is operative and the repeat pawl is held out of engagement. When the repeat dial is operated the pawl control bar is moved to the left and the selector pawl is made inoperative, but the repeat pawl is made operative. Now, upon the clockwise or restoring movement of clutch control arm 168, the repeat dial is moved back a step to its zero or normal position by the operation of repeat pawl 250 on ratchet 248.

When it is desired to repeat the preferred selection a greater number of times, it is simply necessary to turn the repeat dial to the corresponding number indicated thereon. It will then be evident that at the end of each playing of the preferred selection, the repeat dial is moved back another step toward its normal or zero position, and at the end of the predetermined number of repetitions the repeat mechanism is made inoperative and normal operating conditions are automatically restored. The ratchets 226 and 248 are held against reverse movement by a check pawl bar 258 resting between shafts 208 and 230 and carrying at its upper ends suitable check surfaces 260.

In the simplified form of the invention shown in Fig. 12 the repeat mechanism is provided by simply making the trip mechanism inoperative. As specifically illustrated, a switch R' is provided in the circuit of trip solenoid 164 and this switch is opened when it is desired to repeat a favored selection. On reflection, it will be evident that inasmuch as the trip mechanism is made inoperative the selection in question will be repeated as long as desired, whereupon the listener need simply close the switch R'. At the end of the sound track, the trip mechanism will operate and the next desired selection will be played, as has already been described. The selection will ordinarily be the next sound track, but the selector dial may, of course, be moved during the playing of the repeated selection to some desired sound track different from the next sound track.

In this simplified form there is no automatic restoration from the repeat condition to the normal playing condition.

Miscellaneous features

To prevent distortion and noise during the shifting of the light beam, it is desirable to make the illumination system inoperative. A simple way to accomplish this result is to fully "expose" or otherwise blacken the film at the transition portion. It may be mentioned that with the present apparatus three inches of film are sufficient for the movement of the light beam from one track to the next adjacent track, but, if optional movement of the light beam to any sound track is sought, provision should be made for sixteeen steps corresponding to sixteen tracks, and this requires four feet of film. This four feet of lead film may be darkened.

In the present apparatus, however, a special shutter is provided to shield the photo-electric cell C during the transition period. Referring to Fig. 2, the shutter 270 is oscillatable into or out of the path of illumination, it being secured to an operating shaft 272. The latter in turn is operated by an arm 274 connected to the clutch control arm 168 by an appropriate link 276. A fragment of link 276 is clearly shown in Fig. 3. Inasmuch as clutch control arm 168 is displaced and held in displaced position during the entire shifting operation, it is evident that the illumination is interrupted and the reproducing system made perfectly silent during the transition period.

A light shutter is also preferably provided to cut off the illumination instantaneously whenever the apparatus is deenergized, because otherwise distortion will result during slowing down of the driving motor and the apparatus. For this purpose I provide a shutter 280, best shown in Fig. 2, which may be moved between the lamp L and the optical system O. The shutter is fixed on an operating shaft 282 which is itself oscillated through linkage generally indicated at 284 connecting the same to the switch shaft 286. It will thus be evident that whenever the control arm A of the switch shaft is swung to the "off" position, the shutter 280 is moved in front of the lamp L. Switch shaft 286 is, of course, connected through linkage 288 to an appropriate electrical switch 290 which controls the energization of the entire apparatus.

Means is provided to shut down the apparatus at the end of the last sound track on the film. For this purpose switch shaft 286 is normally urged to its "off" position by a spring 292, best shown in Fig. 2. When the shaft is moved to the "on" position, however, it is there held by latch mechanism best shown in Fig. 3 and comprising a notched disc 294 mounted on switch shaft 286 and cooperating with a latch 296 pivoted at 298. It will be evident from inspection of Fig. 3 that upon oscillation of the switch shaft 286 in a counter-clockwise direction against the spring, it is locked in "on" position by the latch 296. Cam shaft 134, through gear 194, is provided with a knock-out pin 300 arranged to travel in the path of an arm 302 formed integrally with latch 296. The knock-out pin 300 is located to correspond to the sixteenth sound track. It will thus be evident that upon movement of the cam from the sixteenth to the first sound track, the knock-out pin 300 turns latch 296 counter-clockwise and disengages the latch, thus permitting the spring 292 to move the switch shaft 286 to the "off" position. This movement is, of course, accompanied by opening of the electrical circuit of the apparatus and by movement of the shutter 280 in front of the lamp.

If the listener wishes to shut down the apparatus manually before the last sound track is reached, he has merely to push the switch arm A inwardly against the axial resistance of spring 92, thereby moving the notched disc 294 axially out of engagement with latch 296, whereupon the spring 292 oscillates the switch shaft 286 to its "off" position.

It will be remembered that the repeat mechanism involved a complete rotation of the cam shaft, and it is therefore desirable to make the automatic stopping mechanism ineffective when the repeat mechanism is used. For this purpose an auxiliary latch 297 is provided which also cooperates with the notched disc 294. The latch 297, however, is moved into engagement with notched disc 294 only when the pawl control bar 236 is moved to the left by the repeat cam 232. With latch 297 made effective, any tripping movement of latch 296 is of no consequence, for the switch shaft 286 is not released for movement to its "off" position.

Operation

It is believed that the operation of my sound film apparatus will be understood from the foregoing detailed description. The operation may, however, be briefly reviewed as follows. The film is guided between the illumination and light-sensitive portions of the apparatus by appropriate feed and take-up sprockets, the film being taken from and returned to an endless reel supported in an appropriate magazine. The sound track being played is indicated on the indicator dial I. At the end of the sound track a notch in the film causes energization of the trip solenoid which in turn moves the clutch control arm and causes clutch engagement. At the same time the selector dial is advanced one step, so that the wiper of the selector dial corresponds to the next sound track to be played, although the numeral indicated on the selector dial will at that instant indicate two sound tracks in advance. In other words, under normal playing conditions the selector dial indicates one number in advance of the indicator dial, even though the wiper of the selector dial registers with the wiper of the indicator dial. At the completion of the tripping movement of the clutch control arm, the restoring solenoid switch 220 is closed, but in the meantime the registration of the indicator and selector switch drums has been disturbed, so that the restoring solenoid remains deenergized. Rotation of the clutch causes rotation of the cam 122 and this moves the plate O' sidewardly and thereby optically shifts the light beam toward the next sound track. When the next sound track is reached, the incidental rotation of the cam shaft brings the wiper 196 of the cam shaft drum switch into registration with the wiper 210 of the selector shaft drum switch, thereby closing the circuit of the restoring solenoid and causing the clutch control arm 168 to be moved back to its normal position where it disengages the clutch. The energization of the restoring solenoid is interrupted by the switch 220.

When the listener wishes to skip several tracks and hear a later selection, he merely turns the selector dial S to the sound track next desired. This moves the wiper 210 a number of steps out of registration, so that when the clutch is engaged it remains engaged until the cam shaft has rotated a sufficient number of steps to bring the wiper 196 of the cam shaft switch up to a position corresponding to the desired sound track. The restoring solenoid is then energized and the operation of the apparatus proceeds in a normal progressive manner from the new point on.

If a selection is to be repeated once, it is merely necessary to turn the repeat dial R to the number 1, which makes the selector pawl inoperative while making the repeat pawl operative. The movement of the clutch control arm then does not move the selector dial, so that the lower wiper contact remains stationary while the upper wiper contact moves. The contacts are then not brought into registration until the cam has moved a complete revolution, thereby bringing the light beam back to its initial position. The movement of the clutch control arm restores the repeat mechanism to initial condition so that normal playing of the apparatus will thereafter proceed. When the selection is to be repeated more than once, the only difference in operation is that the repeat dial is notched back to normal position through several steps corresponding to the several planes of the sound track before the zero position is finally reached. At that time, of course, the repeat pawl is again made inoperative, while the selector pawl is made operative. The arrangement of Fig. 12 is simpler in construction and operation, repetition being obtained by preventing the trip action, but in this case the restoration of normal playing conditions must be attended to manually and no predetermining the number of repetitions is possible.

Under normal playing conditions, at the end of the playing of the last sound track the apparatus is automatically stopped by the knock-out pin 300, disengaging latch 296 from the switch shaft. During the transition periods the illumination system is shuttered by shutter 270, and, whenever the apparatus is shut down by the switch arm A, the illumination system is shuttered by the shutter 280.

It is believed that the many advantages of my improved apparatus will be apparent from the foregoing detailed description. The separation of the optical system into two parts one of which is fixed against transverse movement but arranged for various adjustments, and the other of which is fixed against axial movement but is accurately guided for transverse movement, manifestly results in an improved and simplified construction and establishes an exceedingly convenient and neat way of shifting the light beam from one sound track to another. The movement of the light beam through the agency of a cam, as disclosed, is equally valuable whether arranged for simple manual operation or automatic operation such as has been described. The automatic progressive feed of the light beam is, of course, extremely valuable for the reproduction of operas, plays, or the reading of a book, etc. When, however, the film carries a series of independent selections, the various other features making possible optional selection of any desired sound track and repetition of any desired sound track are of obvious value.

It will be apparent that while I have shown and described my invention in preferred form, many changes and modifications may be made in the structure disclosed without departing from the spirit of the invention, defined in the following claims.

I claim:

1. Sound film apparatus comprising a lamp, an optical system including a first lens system, a mechanical slit, and a second lens system, a light-sensitive cell, means to guide a film between the second lens system and the cell, and means to move the second lens system alone transversely of the axis of the optical system in order to shift the light beam transversely of the optical system to direct it upon a sound track on the film.

2. Sound film apparatus comprising a lamp, an optical system including a first lens system, a mechanical slit, and a second lens system, a light-sensitive cell, means to guide a film having a plurality of collateral sound tracks between the second lens system and the cell, means mounting the second lens system for movement sidewardly but not axially, and means mounting the first lens system for movement axially but not sidewardly.

3. Sound film apparatus comprising a lamp, an optical system including a first lens system, a mechanical slit, and a second lens system, a light-sensitive cell, means to guide a film having a plurality of collateral sound tracks between the second lens system and the cell, means mounting the second lens system for movement sidewardly but not axially, and a cylindrical tube mounting the first lens system and the slit for movement axially and rotatively but not sidewardly.

4. Sound film apparatus comprising a lamp, an optical system including a condenser lens, a cylindrical lens, a mechanical slit, and a camera lens, a light-sensitive cell, means to guide a film between the optical system and the cell, said film having a plurality of collaterally disposed sound tracks, and mechanism to provide selection of one or another of the sound tracks as well as appropriate adjustments of the optical system including means to move the camera lens system alone transversely but not axially, and independent means for providing axial or focusing adjustment of the remainder of the optical system as well as rotation of the mechanical slit, said optical system exclusive of the camera lens system not being movable transversely.

5. Sound film apparatus comprising a lamp, an optical system including a tube provided with a first lens system and a mechanical slit, stationary supports bored to receive said tube and to afford axial movement, and a plate carrying a second lens system and transversely slidable across the end of the tube, a light-sensitive cell, means to guide film between the optical system and the cell, means causing longitudinal adjustment of the tube in the supports for focusing the slit, and means causing transverse movement of the slidable plate for directing the light beam upon a sound track on the film.

6. Sound film apparatus comprising a lamp, an optical system including a tube provided with a condenser lens system, a cylindrical lens, and a mechanical slit, stationary supports bored to receive said tube and to afford axial and rotative movement thereof, and a plate carrying a camera lens system and transversely slidable across the end of the tube, a light-sensitive cell, means to guide film between the optical system and the cell, said film having a plurality of collaterally disposed sound tracks, means causing longitudinal adjustment of the tube for focusing the slit, means causing rotation of the tube for aligning the slit, and means causing movement of the slidable plate for shifting the light beam from one to another of the sound tracks on the film.

7. Sound film apparatus comprising a lamp, an optical system including an axially movable tube provided with a first lens system and a mechanical slit, and a plate carrying a second lens system and transversely slidable across the end of the tube, a light-sensitive cell, and means to guide film between the optical system and the cell, means affording longitudinal adjustment of the tube for focusing the slit, and means including a continuous cylindrical cam and means to rotate said cam for causing transverse movement of the slidable plate in order to shift the light beam across the film.

8. Sound film apparatus comprising a magazine for a film having a plurality of collaterally disposed sound tracks, a lamp, an optical system including a first lens system, a mechanical slit, and a second lens system, a light-sensitive cell, means to guide the film between the optical system and the cell, said second lens system alone being movable to direct the light beam upon a desired sound track, and mechanism for so automatically moving the second lens system in relation to the film movement as to provide sequential sound translation from the several sound tracks on the film.

9. Sound film apparatus comprising a magazine for an endless film having a plurality of collaterally disposed sound tracks, a lamp, an optical system including a first lens system, a mechanical slit, and a second lens system, a light-sensitive cell, means to guide the film between the optical system and the cell, said second lens system alone being movable to direct the light beam upon a desired sound track, and a unidirectionally rotatable mechanism for automatically moving the second lens system in relation to the film movement.

10. Sound film apparatus comprising a magazine for a film having a plurality of collaterally disposed sound tracks, a lamp, an optical system including a first lens system, a mechanical slit, and a second lens system, a light-sensitive cell, means to guide the film between the optical system and the cell, said second lens system alone being movable to direct the light beam upon a desired sound track, and trip mechanism responsive to an indicator on the film for automatically moving the second lens system.

11. Sound film apparatus comprising a magazine for an endless film having three or more collaterally disposed sound tracks, a lamp, an optical system including a first lens system, a mechanical slit, and a second lens system, a light-sensitive cell, means to guide the film between the optical system and the cell, said second lens system alone being movable to direct the light beam upon a desired sound track, and trip mechanism responsive to an indicator on the film for automatically and progressively moving the second lens system so as to translate the successive sound tracks in sequential order.

12. Sound film apparatus comprising a magazine for film having a plurality of collaterally disposed sound tracks, a lamp, an optical system, a light-sensitive cell, means to guide the film between the optical system and the cell, said optical system serving to direct a light beam upon a desired sound track, mechanism for varying the optical system to shift the light beam to a different sound track, and means to automatically shutter the light during such movement.

13. Sound film apparatus comprising a magazine for film having a plurality of collaterally disposed sound tracks, a lamp, an optical system including a first lens system, a mechanical slit, and a second lens system, a light-sensitive cell, means to guide the film between the optical system and the cell, said second lens alone being movable to direct the light beam upon a desired sound track, mechanism for automatically moving the second lens system to translate the several sound tracks, and means to automatically shutter the light system during movement of the lens system from one sound track to another.

14. Sound film apparatus comprising a magazine for an endless film having a plurality of collaterally disposed sound tracks, a lamp, an optical system including a first lens system, a mechanical slit, and a second lens system, a light-sensitive cell, means to guide the film continuously in one direction between the optical system and the cell, said second lens alone being movable to direct the light beam upon a desired sound track, unidirectionally movable mechanism for automatically moving the second lens system to translate the several sound tracks, and to move the second lens system from the last to the first sound track, and means to stop the entire apparatus at the completion of the last sound track on the film.

15. Sound film apparatus comprising a magazine for film having a plurality of collaterally disposed sound tracks, a lamp, an optical system, a light-sensitive cell, means to guide the film between the optical system and the cell, said optical system being variable to direct the light beam upon a desired sound track, mechanism for automatically varying the optical system to a different sound track, and optionally usable means for making the aforesaid mechanism inoperative in order to repeat a desired sound track.

16. Sound film apparatus comprising a magazine for film having a plurality of collaterally disposed sound tracks, a lamp, an optical system including a first lens system, a mechanical slit, and a second lens system, a light-sensitive cell, means to guide the film between the optical system and the cell, said second lens system alone being variable to direct a light beam upon a desired sound track, mechanism for automatically and progressively moving the second lens system so as to translate the different sound tracks, and optionally usable means for making the aforesaid mechanism inoperative in order to repeat a desired sound track.

17. Sound film apparatus comprising a magazine for film having a plurality of collaterally disposed sound tracks, a lamp, an optical system, a light-sensitive cell, means to guide the film between the optical system and the cell, said optical system being variable to direct the light beam upon a desired sound track, mechanism for automatically varying the optical system to a different sound track, optionally usable means for making the aforesaid mechanism inoperative in order to repeat a desired sound track, and means for predetermining to a desired value the number of times the said desired sound track will be repeated before the shifting mechanism is again operative.

18. Sound film apparatus comprising a magazine for film having a plurality of collaterally disposed sound tracks, a lamp, an optical system including a first lens system, a mechanical slit, and a second lens system, a light-sensitive cell, means to guide the film between the optical system and the cell, said second lens system alone being variable to direct a light beam upon a desired sound track, mechanism for automatically and progressively moving the second lens system so as to translate the successive sound tracks, optionally usable means for making the aforesaid mechanism inoperative in order to repeat a desired sound track, and means for predetermining to a desired value the number of times the said desired sound track will be repeated before the shifting mechanism is again operative.

19. Sound film apparatus comprising a magazine for film having a plurality of collaterally disposed sound tracks, a lamp, an optical system, a light-sensitive cell, means to guide the film between the optical system and the cell, said optical system serving to direct a light beam upon a desired sound track, trip mechanism for automatically shifting the light beam, and optionally usable selector means for predetermining to which sound track the light beam is shifted by the trip mechanism regardless of the sound track last reproduced.

20. Sound film apparatus comprising a magazine for film having a plurality of collaterally disposed sound tracks, a lamp, an optical system, a light-sensitive cell, means to guide the film between the optical system and the cell, said optical system serving to direct a light beam upon a desired sound track, trip mechanism for automatically shifting the light beam, optionally usable selector means for predetermining to which sound track the light beam is shifted by the trip mechanism, and automatic mechanism for otherwise normally moving the light beam one sound track ahead.

21. Sound film apparatus comprising a magazine for film having a plurality of collaterally disposed sound tracks, a lamp, an optical system including a first lens system, a mechanical slit, and a second lens system, a light-sensitive cell, means to guide the film between the optical system and the cell, said second lens system alone being movable to direct the light beam upon a desired sound track, trip mechanism responsive to an indicator on the film for automatically moving the second lens system, and optionally usable selector means for predetermining to which sound track the lens system is shifted by the trip mechanism regardless of the sound track last reproduced.

22. Sound film apparatus comprising a magazine for film having a plurality of collaterally disposed sound tracks, a lamp, an optical system including a first lens system, a mechanical slit, and a second lens system, a light-sensitive cell, means to guide the film between the optical system and the cell, said second lens system alone being movable to direct the light beam upon a desired sound track, trip mechanism responsive to an indicator on the film for automatically moving the second lens system, optionally usable selector means for predetermining to which sound track the lens system is shifted by the trip mechanism, and automatic mechanism for otherwise normally moving the lens system one sound track ahead.

23. Sound film apparatus comprising a magazine for film having a plurality of collaterally disposed sound tracks, a lamp, an optical system, a light-sensitive cell, means to guide the film between the optical system and the cell, said optical system serving to direct a light beam upon a desired sound track, trip mechanism for automatically shifting the light beam to a different sound track, optionally usable selector means for predetermining to which sound track the lens system is shifted by the trip mechanism, and optionally usable repeat mechanism for making the aforesaid mechanism inoperative when it is desired to repeat a given sound track.

24. Sound film apparatus comprising a magazine for film having a plurality of collaterally disposed sound tracks, a lamp, an optical system, a light-sensitive cell, means to guide the film between the optical system and the cell, said optical system serving to direct a light beam upon a desired sound track, trip mechanism for automatically shifting the light beam to a different sound track, optionally usable selector means for predetermining to which sound track the lens system is shifted by the trip mechanism, mechanism for otherwise normally moving the light beam one sound track ahead, and optionally usable repeat mechanism for making the aforesaid mechanism inoperative in order to repeat a desired sound track.

25. Sound film apparatus comprising a magazine for film having a plurality of collaterally disposed sound tracks, a lamp, an optical system, a light-sensitive cell, means to guide the film between the optical system and the cell, said optical system serving to direct a light beam upon a desired sound track, trip mechanism for automatically shifting the light beam to a different sound track, optionally usable selector means for predetermining to which sound track the lens system is shifted by the trip mechanism, mechanism for otherwise normally moving the light beam one sound track ahead, optionally usable repeat mechanism for making the aforesaid mechanism inoperative in order to repeat a desired sound track, and means for predetermining the number of times the desired sound track is repeated before the shift mechanism is again made operative.

26. Sound film apparatus comprising an illuminated slit, a lens system, a light-sensitive cell, means to guide a film between the lens system and the cell, and means to move the lens system alone transversely of the optical system in order to shift the light beam by optical leverage so as to direct the light beam upon a sound track on the film.

27. Control mechanism for sound film apparatus including a film with a plurality of sound tracks, and means movable to shift a light beam to a desired sound track, said control mechanism comprising a cam for shifting the light beam, registration means rotatable with said cam, a selector, a second registration means rotatable with said selector, means to start movement of the cam at the end of a sound track, means for moving the selector ahead at the end of a sound track, and means responsive to alignment of the first and second registration means to stop movement of the cam.

28. Control mechanism for sound film apparatus including a film with a plurality of sound tracks, and means to shift a light beam to a desired sound track, said control mechanism comprising a cam to shift said means, a multi-point switch rotatable with said cam, a selector, a multi-point switch rotatable with said selector, means connecting said multi-point switches in series, means to start movement of the cam at the end of a sound track, manually operable means for moving the selector ahead, and means energized by a circuit including the series combination of multi-point switches to stop movement of the cam.

29. Control mechanism for sound film apparatus including an endless film with a plurality of sound tracks, a film drive shaft, and means movable to shift a light beam to a desired sound track, said control mechanism comprising a cam for shifting the light beam, a multi-point switch rotatable with said cam, a selector, a multi-point switch rotatable with said selector, means connecting said multi-point switches in series, a clutch on said film drive shaft, means gearing said clutch to the cam, trip means to engage said clutch, pawl and ratchet mechanism associated with said selector for moving the same ahead upon actuation of the trip means, and means to disengage the clutch, said means being energized by a circuit including the series combination of multipoint switches.

30. Control mechanism for sound film apparatus including an endless film with a plurality of sound tracks, a constantly rotating film drive shaft, and an optical system at least a part of which is movable to shift a light beam to a desired sound track, said control mechanism comprising a continuous cylindrical cam for shifting the light beam, a multi-point switch rotatable with said cam, a selector shaft and dial, a multi-point switch rotatable with said selector shaft, means connecting said multi-point switches in series, a clutch on said film drive shaft, gearing connecting the driven part of said clutch with the cam, a trip solenoid responsive to an indicator on the film to engage said clutch, pawl and ratchet mechanism associated with said selector shaft for moving the same ahead upon actuation of the trip solenoid, and a restoring solenoid to disengage the clutch, said solenoid being energized by a circuit including the series combination of multipoint switches.

31. Control mechanism for sound film apparatus including a film with a plurality of sound tracks, and an optical system movable to shift a light beam to a desired sound track, said control mechanism comprising a cam for shifting the optical system, a registration means rotatable with said cam, a selector, a registration means rotatable with said selector, trip means to start movement of the cam, pawl and ratchet mechanism associated with said selector for moving the same ahead upon actuation of the trip means, means to stop movement of the cam upon alignment of the registration means, and a repeat indicator arranged to make the selector-pawl inoperative.

32. Control mechanism for sound film apparatus including a film with a plurality of sound tracks, and an optical system movable to shift a light beam to a desired sound track, said control mechanism comprising a cam for shifting the optical system, a multi-point switch rotatable with said cam, a selector, a multi-point switch rotatable with said selector, means connecting said multi-point switches in series, trip means to start movement of the cam, pawl and ratchet mechanism associated with said selector for moving the same ahead upon actuation of the trip means, means energized by a circuit including the series combination of multi-point switches to stop movement of the cam, a repeat shaft and indicator, pawl and ratchet mechanism on said repeat shaft, means coupling the same to the trip means, means coupling the selector and repeat pawls so that one is made inoperative when the other is operative, and a cam on said repeat shaft cooperating with said last-mentioned means to make the selector pawl inoperative except when the repeat shaft and indicator are at zero.

33. Control mechanism for sound film apparatus including an endless film with a plurality of sound tracks, a constantly rotating film drive shaft, and an optical system movable to shift a light beam to a desired sound track, said control mechanism comprising a continuous cam for shifting the optical system, a multi-point switch rotatable with said cam, a selector, a multi-point switch rotatable with said selector, means connecting said multi-point switches in series, a clutch on said film drive shaft, gearing connecting the driven part of said clutch with the cam, trip means responsive to an indicator on the film to engage said clutch, pawl and ratchet mechanism associated with said selector for moving the same ahead upon actuation of the trip solenoid, restoring means to disengage the clutch, said means being energized by a circuit including the series combination of multi-point switches, a repeat shaft and indicator, pawl and ratchet mechanism on said repeat shaft, means coupling the same to the trip means, means relating the selector and repeat pawls so that one is made inoperative when the other is operative, and a cam on said repeat shaft cooperating with said last-mentioned means to make the selector pawl inoperative except when the repeat shaft and indicator are at zero.

34. Sound film apparatus comprising a magazine with an endless film having a plurality of collaterally disposed sound tracks, a lamp, an optical system, a light-sensitive cell, means to guide the film between the optical system and the cell, means to drive the film constantly in one direction, said optical system being variable to direct the light beam upon a desired sound track, mechanism for automatically varying the optical system to a different sound track, and optionally usable means for making the aforesaid mechanism inoperative in order to repeat a desired sound track.

35. Sound film apparatus comprising a magazine with an endless film having a plurality of collaterally disposed sound tracks, a lamp, an optical system, a light-sensitive cell, means to guide the film between the optical system and the cell, means to drive the film constantly in one direction, said optical system being variable to direct the light beam upon a desired sound track, mechanism for automatically varying the optical system to a different sound track, optionally usable means for making the aforesaid mechanism inoperative in order to repeat a desired sound track, and means for predetermining to a desired value the number of times the said desired sound track will be repeated before the light-varying mechanism is again operative.

36. Sound film apparatus comprising a magazine with an endless film having a plurality of collaterally disposed sound tracks, a lamp, an optical system, a light-sensitive cell, means to guide the film between the optical system and the cell, means to drive the film constantly in one direction, said optical system serving to direct the light beam upon a desired sound track, trip mechanism for automatically shifting the light beam, and optionally usable selector means for predetermining to which sound track the light beam is shifted by the trip mechanism regardless of which sound track was last reproduced.

37. Sound film apparatus comprising a magazine with an endless film having a plurality of collaterally disposed sound tracks, a lamp, an optical system, a light-sensitive cell, means to guide the film between the optical system and the cell, means to drive the film constantly in one direction, said optical system serving to direct a light beam upon a desired sound track, trip mechanism for automatically shifting the light beam, optionally usable selector means for predetermining to which sound track the light beam is shifted by the trip mechanism, and automatic mechanism for otherwise normally moving the light beam one sound track ahead.

38. Sound film apparatus comprising a magazine with an endless film having a plurality of collaterally disposed sound tracks, a lamp, an optical system, a light-sensitive cell, means to guide the film between the optical system and the cell, means to drive the film constantly in one direction, said optical system serving to direct a light beam upon a desired sound track, trip mechanism for automatically shifting the light beam to a different sound track, optionally usable selector means for predetermining to which sound track the lens system is shifted by the trip mechanism, and optionally usable repeat mechanism for making the aforesaid mechanism inoperative when it is desired to repeat a given sound track.

39. Sound film apparatus comprising a magazine with an endless film having a plurality of collaterally disposed sound tracks, a lamp, an optical system, a light-sensitive cell, means to guide the film between the optical system and the cell, means to drive the film constantly in one direction, said optical system serving to direct a light beam upon a desired sound track, trip mechanism for automatically shifting the light beam to a different sound track, optionally usable selector means for predetermining to which sound track the lens system is shifted by the trip mechanism, mechanism for otherwise normally moving the light beam one sound track ahead, and optionally usable repeat mechanism for making the aforesaid mechanism inoperative in order to repeat a desired sound track.

40. In combination, a film support comprising a pair of rollers so spaced as to engage the side edges of the film, one of said rollers being provided with film engaging sprocket teeth, the adjacent ends of said rollers having no connection therebetween and providing a free and unobstructed light passage to a film supported on one side of the said rollers, and a light source in alignment therewith and located on the opposite side of said rollers, whereby the path of light to said film crosses the axis of rotation of said rollers.

41. Sound film apparatus comprising a lamp, an optical system including a first lens system, a mechanical slit, and a second lens system, a light-sensitive cell, means to guide a film between the second lens system and the cell, said means comprising a pair of rollers spaced to support the edges of the film, the adjacent ends of said rollers being unconnected and providing a free and unobstructed light passage to the film, said film being located on the side of the rollers adjacent the photo-electric cell and remote from the second lens system, and means to move the second lens system alone transversely of the axis of the optical system in order to shift the light beam transversely of the optical system to direct it upon a sound track on the film.

FREEMAN H. OWENS.